Figure 1:
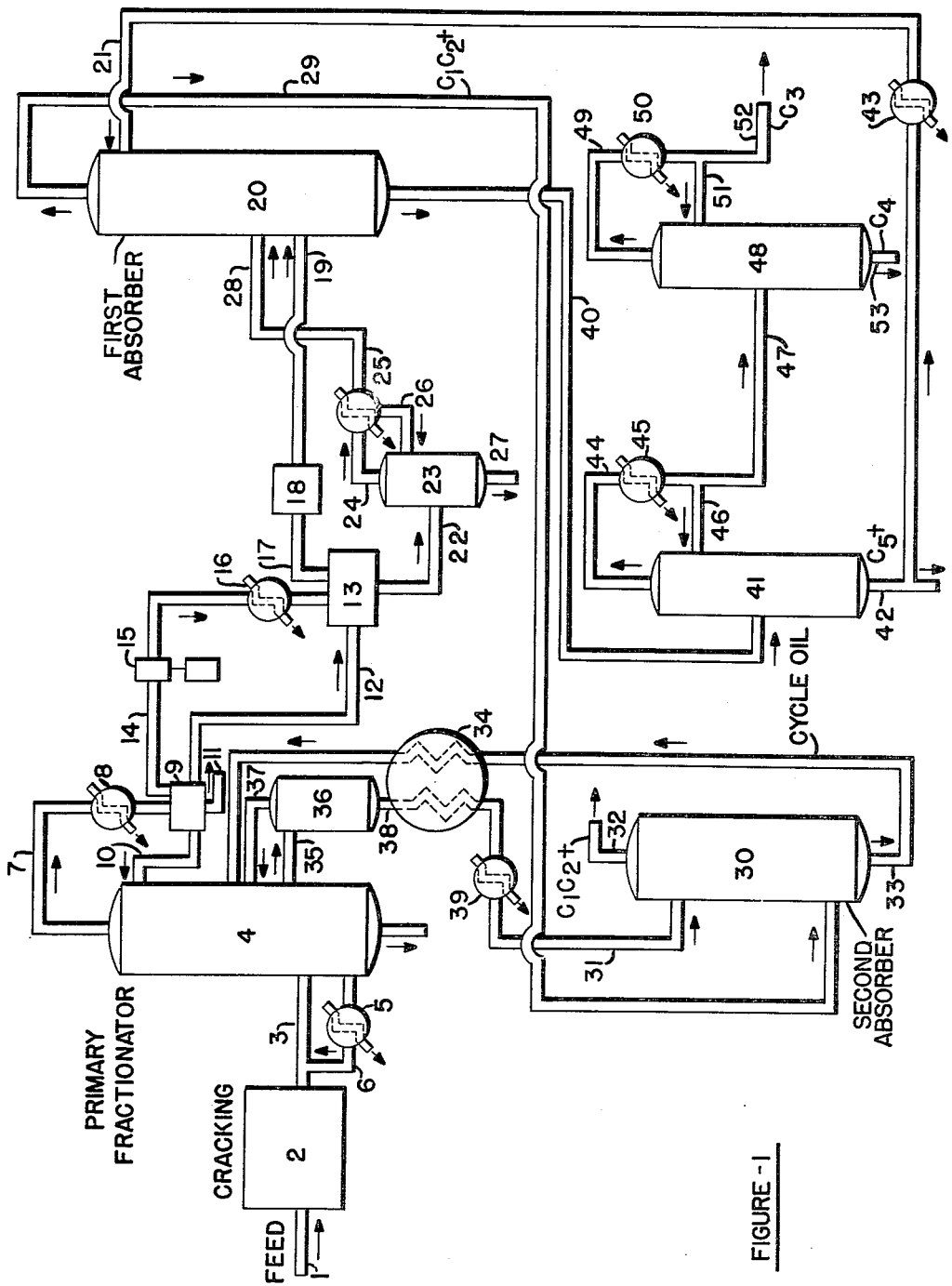

May 15, 1956 R. H. JOHNSTON ET AL 2,745,889
SEPARATION OF C$_2$, C$_3$ AND C$_4$ ALKENES
FROM HIGHLY CRACKED DISTILLATES
Filed June 22, 1953 2 Sheets-Sheet 1

Robert H. Johnston
George E. Mitchell     Inventors
By Henry Berk  Attorney

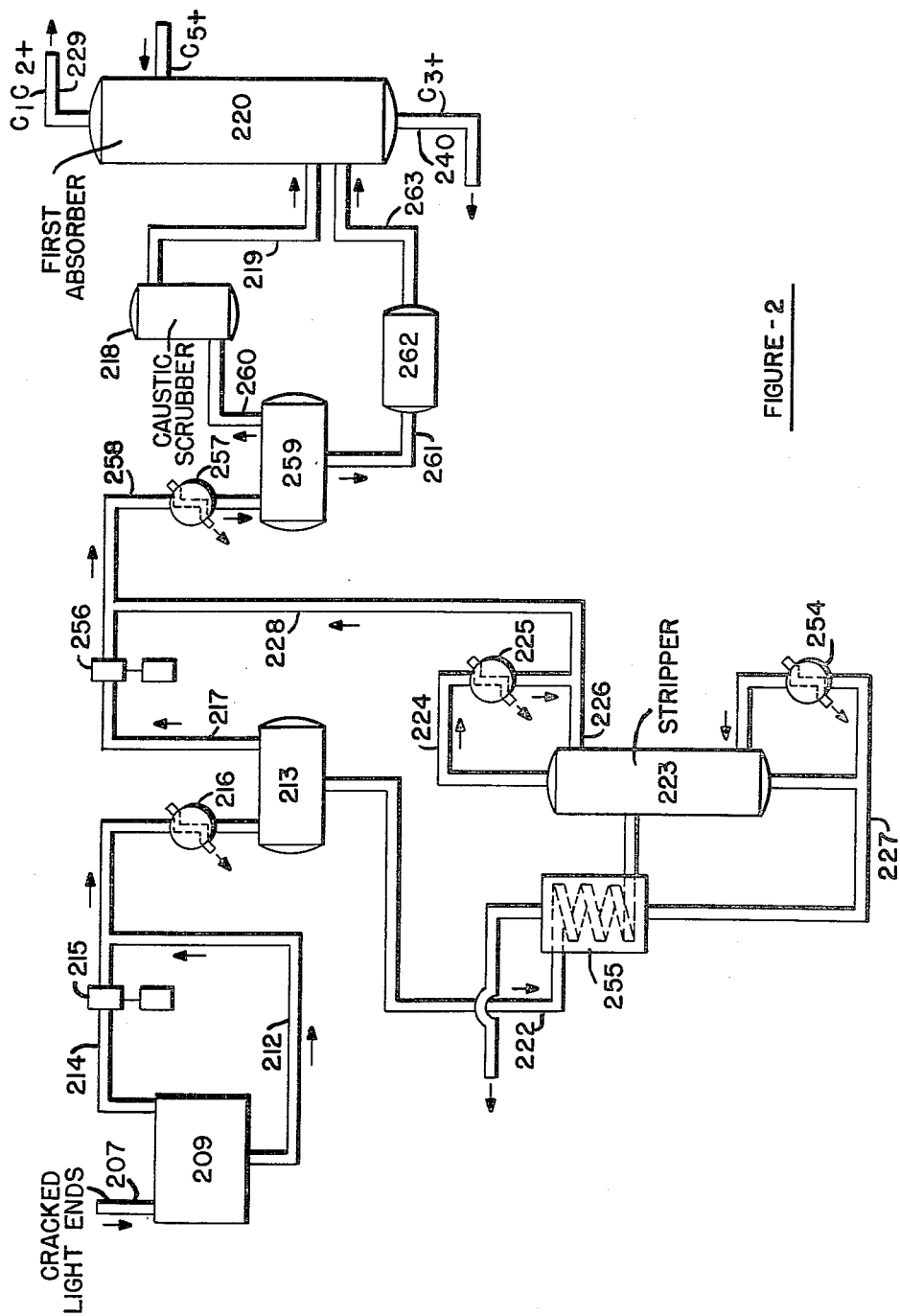

United States Patent Office

2,745,889
Patented May 15, 1956

2,745,889

SEPARATION OF C₂, C₃ AND C₄ ALKENES FROM HIGHLY CRACKED DISTILLATES

Robert H. Johnston, Chatham, N. J., and George E. Mitchell, Baton Rouge, La., assignors to Esso Research and Engineering Company, a corporation of Delaware Application June 22, 1953, Serial No. 363,050

7 Claims. (Cl. 260—677)

This invention relates to the processing of light hydrocarbons produced by high-temperature and low pressure cracking. Such hydrocarbons include in large proportion $C_2$ to $C_6$ olefins and diolefins which have very reactive tendencies to polymerize. The processing to separate these hydrocarbons into cuts of different molecular weights has to be done with minimum temperatures and minimum residence time to prevent product losses and equipment fouling.

To accomplish efficient separation of the unsaturated hydrocarbons under suitable conditions for preventing product degradation at excessive rates, the present invention makes use of a dual oil absorption system combined with a high-temperature primary fractionator.

The high-temperature primary fractionator, primarily, fractionally distills the light hydrocarbons to be processed away from heavier cracked products. The light hydrocarbons, which include $C_2$–$C_4$ alkenes with $C_5+$ naphtha, are then forwarded to the first of the dual oil absorption systems, preferably through steps which will be given in more detail.

From the first oil absorption, a relatively dry gas $C_2$ fraction rich in ethylene is obtained but this gas fraction has to be further treated in the second oil absorption for additional proper fractionation.

A lean absorption oil adopted for the second absorption comes from the primary fractionation, and the fat oil from the second absorption is returned to the primary fractionator for stripping and release of low boiling diolefin monomers at elevated temperatures which cause depolymerization. This is an important feature of recovering the $C_2$–$C_6$ unsaturated hydrocarbons as monomers.

The primary fractionator, suitably operated at low pressures and high temperatures, performs the functions of recracking or depolymerizing diene polymers in the fat gas oil absorbent from the second oil absorber and of supplying the lean oil to the second oil absorber. At the same time, the primary fractionator supplies a heavier recycle fraction as quench to the hot cracked product stream entering this fractionator, and separates overhead the cracked light hydrocarbons which include the recovered $C_2$–$C_6$ components, and separates a tar bottoms.

An older method of processing high temperature cracked products rich in unsaturated and aromatic hydrocarbons is shown in the U. S. Patent, 2,348,659 of B. I. Smith et al. It will readily be seen how the present invention clearly departs therefrom by using the dual oil absorption systems conjointly with the primary fractionator and in several other specific features.

The attached drawing shows a flow plan of steps used to accomplish the invention. Fig. 1 shows a flow plan of major steps used. Fig. 2 shows a preferred modification for obtaining the light hydrocarbon stream passed from the primary fractionator to the first absorber.

In Fig. 1 of the drawing, an initial total naphtha, heavy naphtha, kerosene, gas oil, or heavier petroleum feed is supplied by line 1 to a cracking unit 2 for cracking at elevated temperatures of 1000 to 1400° F. but preferably low pressures of about 1 to 5 atmospheres. Steam in high proportions of about 50 to 90 mole percent are supplied to reduce the hydrocarbon partial pressure during the cracking and primary fractionation.

The present invention is not concerned with details of the cracking operation but with processing the highly unsaturated and aromatic hydrocarbons characteristically resulting from the high-temperature processes. The materials may be cracked in vapor phase or mixed phase, usually in a fraction of a minute or a few minutes by what is known as steam-cracking, fluid cracking or other kinds of cracking processes.

Outlet line 3 leads effluent hot cracked products from the cracking unit 2 to a low part of the primary fractionator 4. Generally a heavy fraction from the primary fractionator, partly cooled in heat exchanger 5, is recycled as a quench into the hot cracked products to lower their temperature to about 400°–650° F. in the outlet line 3 before they enter the primary fractionator 4.

Primary fractionator 4 is equipped with plates or equivalent fractionating means and is controlled in temperatures to distill overhead light hydrocarbons boiling up to or through about 400° F.–460° F. or 500° F., to form an intermediate gas oil boiling in the range of about 400° F. or 460° F. to 650° F., a heavier gas oil cycle stock for recycling as quench oil, and leave a tar bottoms. These results are obtained with about 10 to 30 plates, a top vapor temperature of about 200° F. to 400° F., intermediate plate temperatures of 400° F. to 550° F. and a bottoms temperature of 550° F. to 700° F. under low pressures of about 1 to 10 atmospheres.

The light hydrocarbons distilled overhead are passed by line 7 through a cooler 8 into receiver 9. Some of the condensate in receiver 9 is refluxed by line 10 for controlling top temperatures in fractionator 4. Aqueous condensate settled in receiver 9 may be drained by line 11. A portion of hydrocarbon liquid distillate boiling up to about 400° F. or 500° F. is forwarded by line 12 to tank 13. Hydrocarbons, gaseous and vaporized, at temperatures up to about 120° F. at about 1 atmosphere are withdrawn from receiver 9 by line 14 into a compressing and cooling system, which may have one or more compressors, reciprocal or centrifugal, e. g. compressor 15 and cooler 16. In this compressing and cooling system, higher than $C_4$ components are condensed in so far as possible in a short period. Condensate from the compressing and cooling can be mixed with distillate passed from receiver 9 via line 12 in tank 13. The separation of the light $C_2$–$C_4$ components from higher components with minimum heating and exposure is greatly aided by using such steps of partial condensation by compressing and cooling.

The uncondensed $C_1$ to $C_4+$ gaseous hydrocarbon stream is passed on from tank 13 by line 17. It may be caustic scrubbed and washed to remove sulfur contaminants in unit 18. This gaseous stream, preferably freed of sulfur contaminants, is passed by line 19 into a low part of absorber 20 for removal of $C_3$ and higher components, so as to leave mainly $C_1$ and $C_2$ components (methane, ethane, and ethylene) unabsorbed. Since this absorber functions mainly to separate $C_2$ components it will be termed a "de-ethanizer." As complete separation of $C_2$ components as is practical is desired at this point.

The de-ethanizer, or first oil absorber, in general, operates with a top overhead gas stream temperature of about 60° to 75° F. for an inlet stream of about 80° to 120° F. under a pressure of 225 to 275 p. s. i. g. Low boiling absorbent oil of mainly $C_5$ and higher components, which boil mainly in the range of 100° F. to 200° F. or to 410° F. is supplied by line 21 to the upper part of absorber 20 at a rate of about 0.7 to 1.0 moles per mole of total feed. The heat of absorption may be removed by suitable heat exchange coolers or similar means. It is important that the low boiling absorbent oil be a fraction from the products of the cracking operation. Use of an extraneous absorbent oil would result in degradation of the $C_5+$ components of the absorber feed.

Additional amounts of $C_1$ to $C_4+$ hydrocarbons can be stripped from the condensates passed from tank 13 by line 22 to stripping zone 23. This stripping zone has an overhead line 24 to cooler 25 from which reflux is returned to the top by line 26 and bottom withdrawal line 27 for $C_5+$ components. The $C_1$ to $C_4+$ components in the overhead distillate are passed by line 28 to the absorber 20.

The temperatures in the lower stripping section of the de-ethanizer 20 depend on the volatility of the lean oil. By using the light lean oil, low temperatures, e. g. preferably below 300° F. can be used in the stripping section to minimize product degradation and equipment fouling.

It is significant to note that the lean absorbent oil fed by line 21 to the upper part of the de-ethanizer 20 does not have a critical requirement on the lowest boiling components, since any methane, ethane and ethene components present will be taken overhead satisfactorily.

In any event the overhead $C_1C_2$ (methane, ethane, and ethene) mixture is passed by line 29 to the second absorber 30 to be treated therein with a more non-volatile oil absorbent, which absorbs a small amount of the $C_1$ to $C_2$ hydrocarbons in absorbing practically all $C_3$ and higher components present. This second oil absorber makes a good clean up of components having higher molecular weights than the $C_2$ components to give an overhead raffinate of concentrated ethene containing less than about .01% of such higher molecular weight components. Use of the second absorber also makes it possible to operate the first absorber with the combination of light $C_5+$ lean oil, relatively low temperatures and pressures, and bottoms product essentially free of $C_2$ and lighter components.

A further advantage of using the second absorber in combination with the primary fractionator is that the absorbed $C_3$ and higher components are brought back for recovery in the cyclic system.

The de-ethanizer overhead stream may contain more $C_5$ to $C_6$ components than $C_3$ to $C_4$ components, and they will be fully removed in the second absorber, then be recovered by stripping from the fat cycle oil in the primary fractionator 4.

The second absorber 30 receives the $C_1C_2+$ stream from line 29 at about 70° F. to 80° F. or about 72° F. at 245 p. s. i. g. The lean gas oil or lean cycle oil is passed into the upper part of the second absorber 30 at about 60° F. from line 31 to flow countercurrently to the $C_1C_2$ gaseous hydrocarbons, which are to be taken overhead at about 70° F. through line 32.

The fat absorbent cycle oil is withdrawn from the bottom part of the second absorber 30 at about 72° F. by line 33, is preheated in heat exchanger 34, then flowed into the primary fractionator 4 at about 300° F. to 400° F., or say 360° F.

The fat absorbent cycle oil returned from the second absorber 30 by line 33 into primary fractionator 4, is subjected to temperatures best suited for depolymerizing dimers and polymers of $C_5+$ dienes, such as dicyclopentadiene and the like. These temperatures are in the range of 350° F. to 650° F. The resulting monomeric dienes are swept out quickly as they are diluted by other hydrocarbons being distilled in fractionator 4. The thus recovered diene monomers are reprocessed in the manner explained.

A side stream of the cycle oil, which is a light gas oil, is withdrawn by line 35 to a side stream stripper 36 for vapor pressure adjustment by practically complete stripping of hydrocarbons boiling below about 460° F. that are returned to primary fractionator 4 by line 37. Steam may be used to aid the stripping in stripper 36. The stripped cycle oil is passed from the bottom of stripper 36 by line 38 through heat exchanger 34, where this oil is lowered in temperature from above 420° F. to below 150° F. and then through cooler 39 for further cooling. The stripped or lean cycle oil should be about 60° F. in the line 31 on being passed into the top of the 2nd absorber 30.

Returning attention to the de-ethanizer or first absorber 20, wherein the gaseous hydrocarbons are scrubbed under conditions to leave mainly methane, ethane, and ethene in the overhead gas, it is to be seen that the fat absorbent naphtha oil is withdrawn from the bottom by line 40 for processing to segregate a propene $C_3$ concentrate, and a butene-butadiene $C_4$ concentrate. As in the earlier described steps, at this point it is again desirable to use low temperatures and minimum residence periods in the separation of the $C_4$ and $C_5$ dienes.

The fat oil from the de-ethanizer is led by line 40 into the desorption column 41, which will be termed a "debutanizer" since it serves to separate $C_4$ and lower components from the $C_5+$ naphtha. Column 41 provided with fractionating plates or equivalents preferably acts as a flash zone in having a lower pressure of about 120 p. s. i. g. or lower for quick vaporization of $C_4$ and lower components. The distillation of the $C_4$ and $C_3$ components from the $C_5+$ absorbent oil is carried out at suitably low temperatures. Bottoms of column 41 may be heated up to about 350° F. for removing small amounts of $C_4$ and $C_3$ components, leaving $C_5+$ lean solvent to be withdrawn by line 42. A portion of the $C_5+$ residual fraction is diverted through cooler 43 into the line 21 to be recycled to the de-ethanizer. The other portion of the stripped $C_5+$ fraction is used for recovering valuable components, such as cyclopentadiene, isoprene, piperylene, benzene, toluene, methyl cyclopentadiene, and xylenes and other resin raw materials.

Overhead from column 41 is passed by line 44 to cooler 45 for total or partial condensation. Some condensate is refluxed by line 46. The remaining distillate from column 41 is passed by line 47 to "depropanizing" column 48 to separate a propylene-rich $C_3$ fraction overhead and a butene-butadiene-rich $C_4$ bottoms. The $C_3$ overhead is passed by line 49 to condenser 50. Reflux is sent back by line 50 and remaining $C_3$ distillate product is removed by line 52. The $C_4$ product is removed by line 53.

Columns 41 and 48 may be equipped with about 40 plates, usual reboiling means, etc.

In the modification of Fig. 2, the means serving the same functions as in Fig. 1 are given similar reference numerals. Thus, tank 209 in Fig. 2 serves like tank 9 in Fig. 1 to collect partially condensed gaseous hydrocarbons and naphtha distillate via line 207 from a primary fractionator. The gaseous hydrocarbons are removed by line 214 to be compressed by compressor 215, then commingled with liquid naphtha from line 212.

The combined hydrocarbon streams are passed through cooler 216 into tank 213, which corresponds to tank 13 in Fig. 1.

The uncondensed gaseous hydrocarbons are taken by line 217 from tank 213 to be subjected to a second stage of compression and cooling before a desulfurization in scrubber 218. The desulfurized $C_1$ to $C_4$ hydrocarbons are passed from the vessel 218 by line 219 into the de-ethanizer or first absorber 220 which corresponds to vessel 20 in Fig. 1.

Condensate from tank 213 is passed by line 222 into fractionator 223 for quick separation of components that boil below 200° F. from higher boiling components. Here short hold up time is important for reducing polymerization losses. Fractionator 223, like fractionator 23 in Fig. 1, is operated under pressures of about 10 p. s. i. g., top temperatures of about 150° F. to 190° F., and bottoms temperatures of about 300° F. to 320° F.

The overhead of fractionator 223 is taken by line 224 to condenser 225. Reflux is returned by line 226 to fractionator 223. Bottoms from fractionator 223 may be partly recycled through a reboiler 254. The net amount of bottoms may be withdrawn through line 227 to a preheater 255 for preheating the feed for the fractionator 213.

The uncondensed gaseous $C_1$ to $C_4$ hydrocarbons from tank 213 are passed by line 217 to second stage compressors 256. After this compression, these hydrocarbons, gaseous and partially condensed, may be mixed with liquid distillate taken by line 228 from fractionator 223 for cooling in cooler 257 before being passed by line 258 into drum 259 for additional gas separation.

The gaseous $C_1$ to $C_4+$ components are passed by line 260 to the caustic soda scrubber 218 for removal of sulfur contaminants. The desulfurized gaseous hydrocarbons are passed by line 219 into a low part of first absorber 220 which is fed with $C_5+$ liquid naphtha solvent from line 221.

The condensate from separator 259 may be passed by line 261 to caustic soda contactor 262 for removal of sulfur contaminants. The scrubbed condensate is passed by line 263 into absorber 220 at about the same tray where gaseous hydrocarbons are fed by line 219.

The overhead product removed by line 229 from column 220 may then be treated in the same manner as the overhead from column 20 described in connection with Fig. 1. The bottom product removed by line 240 should be treated in the same manner as bottoms taken by line 4 from column 20 and described in connection with Fig. 1.

The segregation of $C_3$ and $C_4$ components from the bottoms of the first absorber is simplified by having had the $C_2$ and lighter components fully eliminated. The separations of the $C_3$, $C_4$, and higher components benefit from the lowered pressures which in turn make the fractionation temperatures lower.

The sequence of first stripping the $C_3$–$C_4$ mixture from the fat oil of the first absorber in the "de-butanizer" 41 is of additional importance for minimizing equipment fouling. It has been found that the fractionator bottoms temperature is best adjusted to a low level if the $C_5+$ fat absorbent oil is stripped of the $C_3$ together with $C_4$ components rather than if it is first only of $C_3$ components. The temperatures to which the $C_4$ and the $C_5+$ components are exposed are lower, and the $C_5+$ material is subjected to only a single distillation operation in this preferred sequence of debutanizing and depropanizing. In addition to reduced equipment fouling and degradation of products, molecular weight increases resulting from polymerization of the circulating $C_5+$ lean oil are minimized.

Between the primary fractionator, where the light hydrocarbons are separated from heavier cracked products, and the first absorber or de-ethanizer, these light hydrocarbons including very reactive $C_4+$ dienes are segregated most suitably by the combination of partial condensation through compression and cooling with fractional distillation in order to minimize losses and fouling.

In the first absorber 20 of Fig. 1, 220 of Fig. 2, it is important to have as nearly complete removal of $C_2$ and $C_1$ components from the bottoms as possible. With the dual absorber system, the first absorber can be made to function in this direction for increasing recovery of ethylene and minimizing pressures and temperatures in following fractionation equipment.

The temperatures in the stripping sections of the first absorber (de-ethanizer) and of the debutanizer are largely dependent upon the volatility of the $C_5+$ naphtha used as the lean solvent oil. This light volatile lean oil keeps temperatures at a minimum in these stripping sections. Thus product degradation and equipment fouling are reduced.

The circulation of the lean oil is based on the number of moles of the lean oil required to obtain the necessary absorption. Since there are more moles per barrel of light distillate than of heavier distillate, the light lean oil can be used with considerably lower circulation rate.

By using the $C_5+$ light lean oil in the first absorber, recovery of cyclopentadiene and methyl cyclopentadiene can be increased. Any cyclopentadiene and methyl cyclopentadiene dimerized during hold up is not lost to a high boiling fraction, but merely give a high distillation "tail" which can be recovered as a residual dimer concentrate.

The use of the light lean oil in the $C_5$ to 200° F. range has the further advantage combining the stripping and debutanization into a single step.

The use of the heavier cycle or gas oil in the second absorber clean-up of the dry $C_1C_2+$ gas makes possible the use of the light lean oil in the first absorber where the desired de-ethanizing is carried out. The heavier cycle oil used in the second absorber is not processed through stripping sections of the light end towers. Recovery of monomeric dienes from the cycle oil is favorably made to take place in the primary fractionator.

For the purpose of illustration, the following compositions of major streams to and from the dual absorbers are presented.

TABLE I

*Principal components of major streams*

| 1st Absorber (De-Ethanizer) Lean Solvent: $C_5+$ ($C_5$ Diene, $C_6$–$C_7$ Aromatic Fraction) | | | | | 2nd Absorber Lean Solvent: 460/650° F. Cycle Oil | |
|---|---|---|---|---|---|---|
| Vapor Feed | Distillate Feed | Lean Oil | Fat Oil [1] | Dry $C_1C_2+$ Gas [2] | Fat Oil [3] | Dry Gas |
| $H_2$ $C_1$ $C_2=$ $C_2$ $C_3$ $C_3=$ $C_4=$ $C_4==$ (dienes) | $C_1$ $C_2$ $C_2$ $C_3$ $C_3=$ $C_4=$ $C_4==$ $C_5==$ (dienes) $C_6$–$C_7$ (Aromatics) | $C_5==$ $C_6$–$C_7$ | $C_3$ $C_3$ $C_4=$ $C_4==$ $C_5==$ $C_6$–$C_7$ | $H_2$ $C_1$ $C_2=$ $C_2$ | $C_1$ $C_2=$ $C_2$ $C_5==$ $C_5+$ | $H_2$ $C_1$ $C_2=$ $C_2$ |

[1] Debutanizer feed, bottom of column 20 to column 41.
[2] Vapor feed to 2nd absorber which uses cycle gas oil as lean solvent.
[3] Fat oil containing mainly ethylene ($C_2=$) and $C_5==$ = diene monomers and polymers for recycle from bottom of 2nd absorber 30 to primary fractionator 4 for contact with cracked stream.

What is claimed is:

1. The process of separating a narrow ethene-rich fraction from high-temperature cracked light hydrocarbon gaseous products stripped from higher-boiling products in a primary fractionator and separated from overhead distillate thereof, which comprises passing a stream of said gaseous products first through an absorption zone where said stream is contacted with a $C_5+$ hydrocarbon fraction to remove most of the $C_3$ and higher components, said $C_5+$ hydrocarbon fraction being passed into said absorption zone after being stripped free of $C_3$ and $C_4$ components, then passing the remaining ethene-rich stream into contact with a light gas oil from the primary fractionator to remove substantially all remaining $C_5$ diene and higher components by absorption in said oil, and returning said gas oil containing absorbed $C_5+$ components to the primary fractionator.

2. The process of separating narrow $C_2$, $C_3$, and $C_4$ fractions from high temperature cracked products, which comprises separating the bulk of the $C_3$ and $C_4$ components by absorption in a lean $C_5+$ naphtha containing mainly dienes and aromatics in a first absorption zone to leave methane, ethane, and ethene in a gaseous $C_1C_2+$ stream, passing said $C_5+$ naphtha enriched by the absorbed $C_3$ and $C_4$ components but substantially free of $C_2$ components into a fractionating zone wherein the $C_3$ and $C_4$ components are distilled off under lowered pressure, passing the gaseous $C_1C_2+$ stream into a second absorption system in which a cracked gas oil fraction absorbs remaining amounts of $C_3$ and higher molecular weight components from the gaseous $C_1C_2+$ stream to form a $C_2$ rich fraction left unabsorbed, and fractionating a narrow $C_3$ fraction from the $C_4$ components with which they are distilled from the $C_5+$ naphtha.

3. The process of separating $C_2$, $C_3$, and $C_4$ fractions from a high temperature cracked hydrocarbon product vapor stream containing mainly alkenes, dienes, and aromatics, which comprises maintaining most of the $C_2$ to $C_4$ hydrocarbons in vapor phase while higher molecular weight components are condensed therefrom by quenching, compressing and cooling, absorbing $C_3$ and $C_4$ components from the vapor stream in condensed $C_5+$ hydrocarbon liquids under pressure, under conditions leaving $C_2$ and lower components unabsorbed, and distilling absorbed $C_3$ and $C_4$ components from said $C_5+$ liquids under a lowered pressure.

4. The process of separating $C_2$, $C_3$ and $C_4$ fractions from a high-temperature cracked hydrocarbon product vapor stream, which comprises separating from said stream a light gas oil fraction boiling mainly in the range of 460° F. to 650° F. in a primary fractionating zone, separating from said vapor stream passed overhead from said fractionating zone a light naphtha fraction boiling mainly in the range of 100° F. to 200° F. to obtain a remaining vapor stream rich in $C_2$, $C_3$ and $C_4$ components, absorbing from the remaining vapor stream $C_3$ and $C_4$ components in said light naphtha, and treating the remaining vapor stream rich in ethene with a heavier lean oil to absorb therefrom $C_3$ and higher components in a second absorber.

5. The process of claim 4, in which the light gas oil fraction boiling mainly in the range of 460° F. to 650° F. is taken from said primary fractionating zone to be used as said heavier lean oil.

6. The process of separating $C_2$, $C_3$ and $C_4$ fractions from a high-temperature cracked hydrocarbon product vapor stream containing mainly alkenes, dienes, and aromatics, which comprises separating the $C_2$, $C_3$ and $C_4$ components with $C_5+$ naphtha components as a distillate overhead in a primary fractionation zone, concentrating the $C_2$ components in a gas-phase stream by compressing and cooling a gas-phase separated from said overhead distillate, eliminating sulfur contaminants from the gas-phase stream, contacting the gas-phase stream with $C_5+$ naphtha hydrocarbon liquid to absorb therefrom $C_3$ and $C_4$ components but leaving substantially all $C_2$ components unabsorbed, thereafter stripping the absorbed $C_3$ components together with $C_4$ components from the $C_5+$ naphtha hydrocarbon liquid under lowered pressure.

7. The process of separating $C_2$, $C_3$ and $C_4$ components from a high-temperature cracked hydrocarbon vapor stream rich in $C_1$ to $C_4+$ alkenes and dienes, which comprises partially condensing $C_4+$ components from said vapor stream by compressing and cooling said vapor stream, stripping by fractional distillation mainly $C_4$ and lower molecular weight components from the resulting partial condensate, remixing uncondensed components of said vapor stream with the $C_4$ and lower molecular weight components stripped from the partial condensate to obtain a stream rich in $C_1$ to $C_4$ hydrocarbons, and passing said stream rich in $C_1$ to $C_4$ hydrocarbons into contact with a naphtha hydrocarbon fraction boiling mainly in the range of 100° F. to 200° F. to absorb most of the $C_3$ and $C_4$ components but to leave the $C_2$ and lower components unabsorbed from the resulting $C_2$ rich gas.

References Cited in the file of this patent

UNITED STATES PATENTS

| | | |
|---|---|---|
| 2,348,659 | Smith et al. | May 9, 1944 |
| 2,377,736 | White | June 5, 1945 |
| 2,413,503 | Katz | Dec. 31, 1946 |
| 2,514,294 | Rupp | July 4, 1950 |